(12) United States Patent
Atkins et al.

(10) Patent No.: US 9,042,682 B2
(45) Date of Patent: May 26, 2015

(54) CONTENT CREATION USING INTERPOLATION BETWEEN CONTENT VERSIONS

(71) Applicant: Dolby Laboratories Licensing Corporation, San Francisco, CA (US)

(72) Inventors: Robin Atkins, Campbell, CA (US); Tao Chen, Palo Alto, CA (US); Scott Daly, Kalama, CA (US); Walter C. Gish, Oak Park, CA (US); Samir N. Hulyalkar, Los Gatos, CA (US); Michael Rockwell, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 178 days.

(21) Appl. No.: 13/899,942

(22) Filed: May 22, 2013

(65) Prior Publication Data

US 2013/0315505 A1 Nov. 28, 2013

Related U.S. Application Data

(60) Provisional application No. 61/650,854, filed on May 23, 2012.

(51) Int. Cl.
*G06K 9/32* (2006.01)
*G06T 3/40* (2006.01)
*G09G 5/02* (2006.01)
*G09G 5/06* (2006.01)
*G09G 5/00* (2006.01)

(52) U.S. Cl.
CPC .............. *G06T 3/4007* (2013.01); *G09G 5/026* (2013.01); *G09G 5/06* (2013.01); *G09G 2320/0271* (2013.01); *G09G 2320/0285* (2013.01); *G09G 2370/10* (2013.01); *G09G 5/006* (2013.01); *G09G 2320/06* (2013.01); *G09G 2320/066* (2013.01); *G09G 2320/0666* (2013.01)

(58) Field of Classification Search
None
See application file for complete search history.

(56) References Cited

U.S. PATENT DOCUMENTS 5,481,275 A * 1/1996 Mical et al. ................... 345/698
6,232,954 B1 5/2001 Rozzi
6,795,585 B1 9/2004 Parada (Continued)

FOREIGN PATENT DOCUMENTS

WO 2010/021705 2/2010
WO 2011/159617 12/2011

OTHER PUBLICATIONS

Hui-Peng et al, Adaptive Interpolation/Extrapolation and Motion Vector Processing Method for Frame Rate Up Conversion, 2009 Fifth International Conference on Image and Graphics.*

*Primary Examiner* — Andrae S Allison

(57) ABSTRACT

One or more derived versions of image content may be obtained by interpolating two or more source versions of the same image content. A derived version may be targeted for a class of displays that differs from classes of displays targeted by the source versions. Source images in a source version may have been color graded in a creative process by a content creator/colorist. Interpolation of the source versions may be performed with interpolation parameters having two or more different values in two or more different clusters in at least one of the source images. A normalized version may be used to allow efficient distribution of multiple versions of the same content to a variety of downstream media processing devices, and to preserve or restore image details otherwise lost in one or more of the source versions.

20 Claims, 8 Drawing Sheets

(56) References Cited

U.S. PATENT DOCUMENTS

| | | | |
|---|---|---|---|
| 7,162,102 B2* | 1/2007 | Cahill et al. | 382/288 |
| 7,969,478 B1 | 6/2011 | Chen | |
| 2004/0013305 A1* | 1/2004 | Brandt et al. | 382/224 |
| 2006/0067585 A1* | 3/2006 | Pace | 382/243 |
| 2006/0257048 A1* | 11/2006 | Lin et al. | 382/276 |
| 2007/0279315 A1* | 12/2007 | Laves et al. | 345/1.1 |
| 2007/0291179 A1 | 12/2007 | Sterling | |
| 2008/0195977 A1 | 8/2008 | Carroll | |
| 2010/0134529 A1 | 6/2010 | Doser | |
| 2010/0265264 A1 | 10/2010 | Doser | |
| 2010/0289810 A1 | 11/2010 | Doser | |
| 2011/0154426 A1* | 6/2011 | Doser et al. | 725/118 |
| 2011/0200270 A1* | 8/2011 | Kameyama | 382/260 |
| 2012/0026405 A1 | 2/2012 | Atkins | |
| 2012/0229495 A1 | 9/2012 | Longhurst | |
| 2013/0088644 A1 | 4/2013 | Atkins | |

* cited by examiner

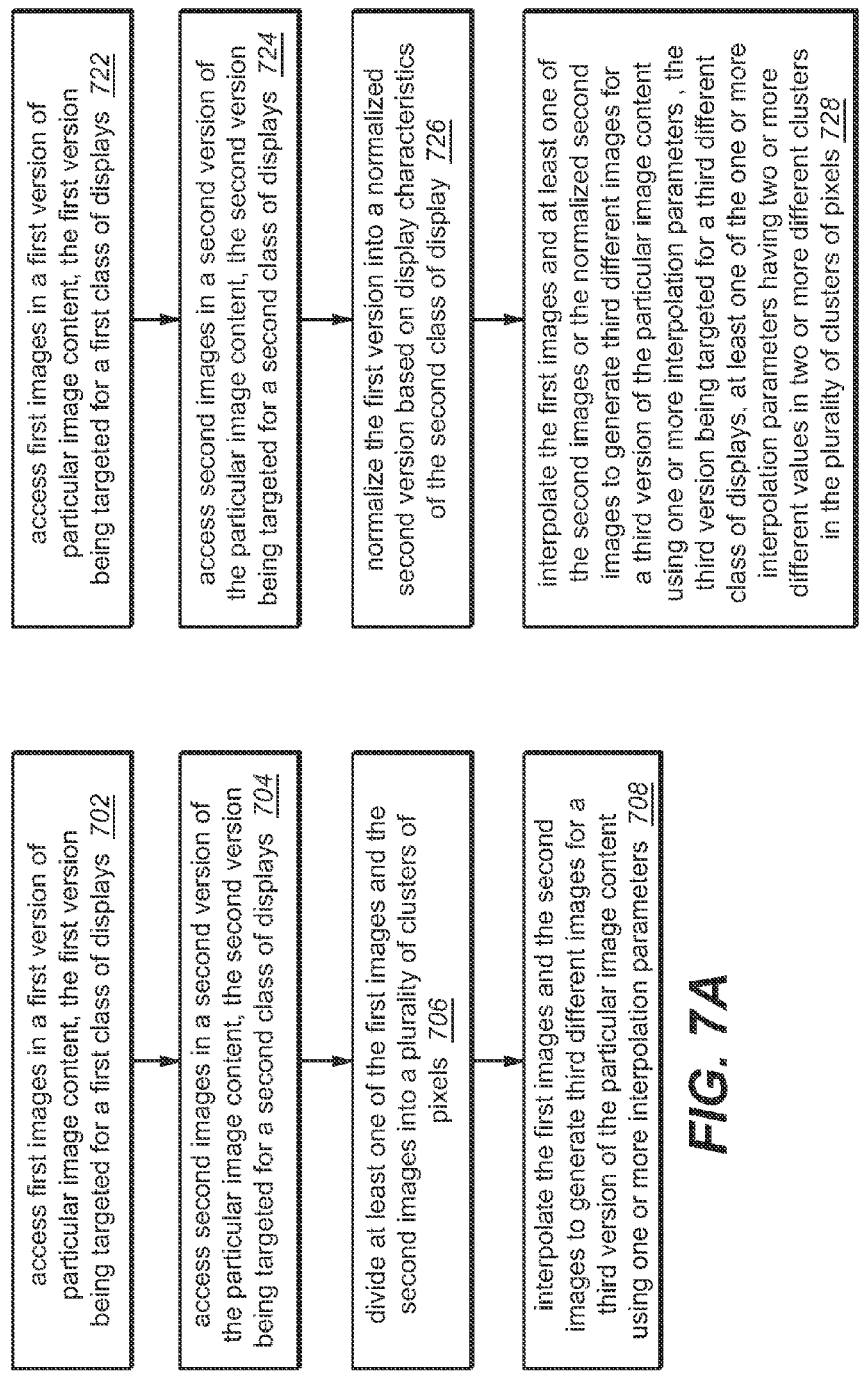

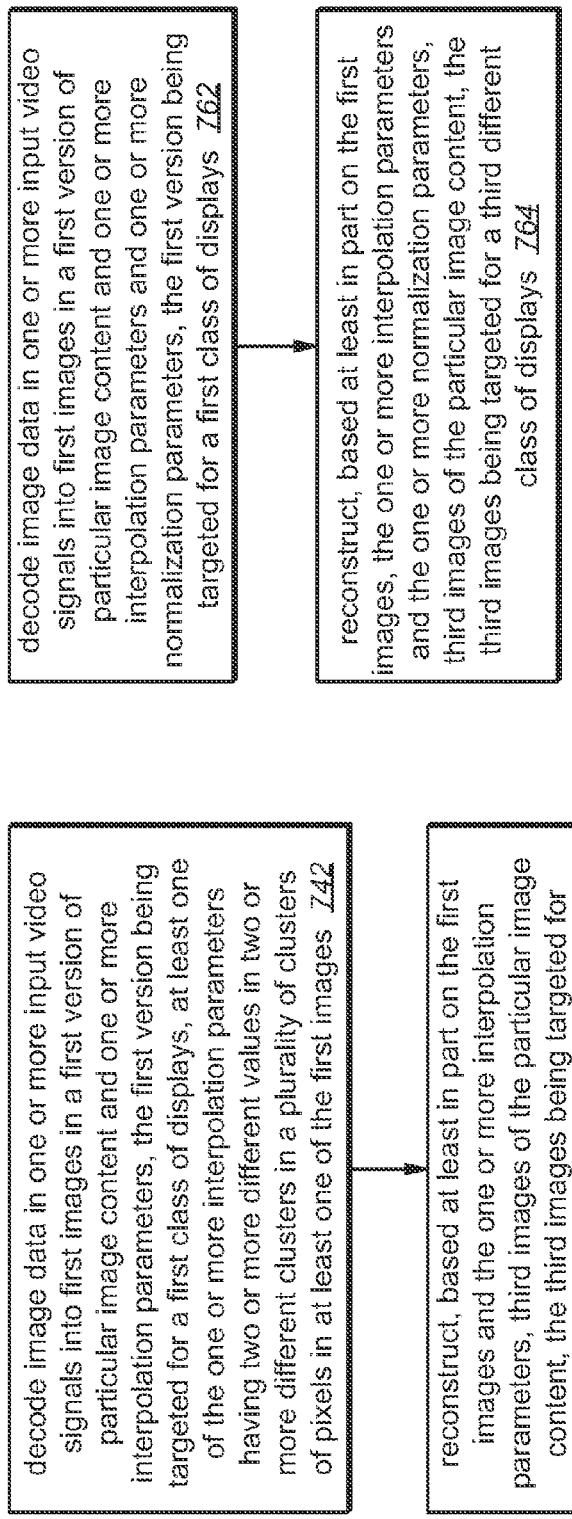

CONTENT CREATION USING INTERPOLATION BETWEEN CONTENT VERSIONS

CROSS REFERENCE TO RELATED APPLICATIONS

This application claims the benefit of U.S. Provisional Application No. 61/650,854, filed on May 23, 2012, which is hereby incorporated by reference in its entirety.

TECHNOLOGY

The present invention relates generally to imaging systems, and in particular, to imaging systems that generate content versions for different classes of displays.

BACKGROUND

Displays may incorporate a wide variety of display technologies. Different displays may have capabilities that differ significantly in areas such as: the range of different colors (gamut) that can be displayed; the maximum brightness achievable; the contrast ratio; the resolution; the color depth; available dynamic range; the white level, the white point, the black point, the number of grey steps, and the like.

A version of video content may appear differently when played back on different displays. When a version of video content targeted for a specific class of displays is rendered without modification by displays in different classes, the rendered images as perceived by a viewer may depart from the creator's creative intent in one or more ways.

Viewing conditions such as ambient light may also affect perception of video content. For example, a version of video content targeted for viewing in theaters may be perceived very differently if the same version is played in other viewing environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 7A through FIG. 7D illustrates example process flows; and

DESCRIPTION OF EXAMPLE EMBODIMENTS

Figure 1:
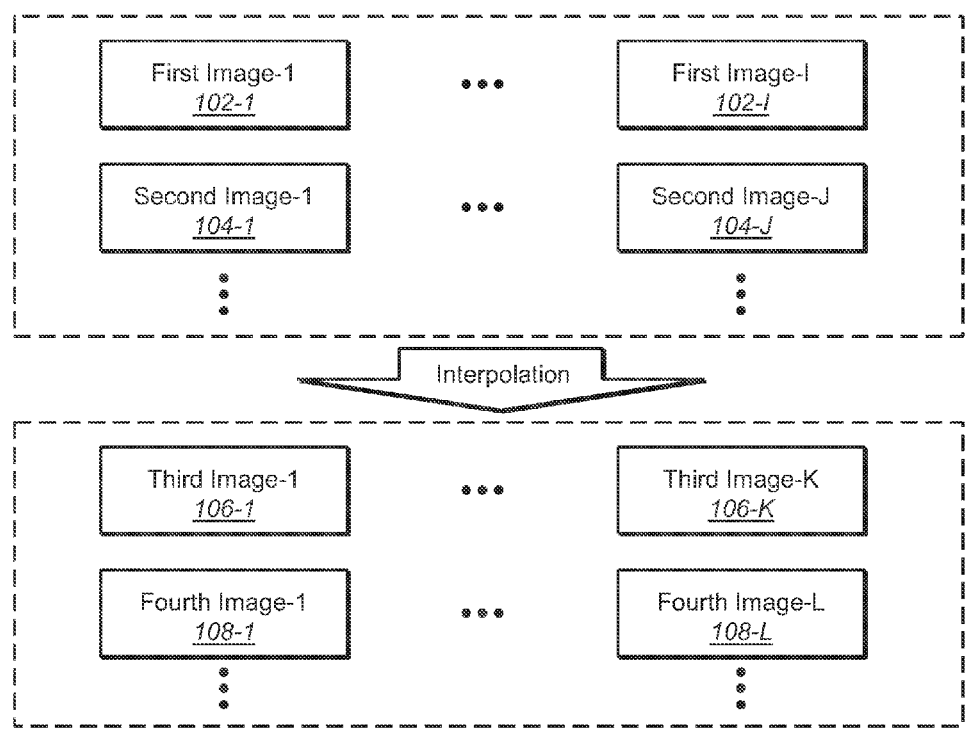
FIG. 1 depicts an example configuration in which two source versions of the same content are used to generate additional versions of the same content, in accordance with an embodiment.

Example embodiments, which relate to generating different versions of the same image content for different classes of displays, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Example embodiments are described herein according to the following outline (outline section headings are for reference purposes only and shall not in any way control the scope of the present invention):

1. GENERAL OVERVIEW
2. VERSIONS OF CONTENT AND CLASSES OF DISPLAYS
3. CONTENT VERSION CREATION
4. SIMILARITY MEASURES
5. CONTENT VERSION DISTRIBUTION
6. CLIPPED IMAGE VALUES
7. ALTERNATIVE VERSIONS OF CONTENT
8. NORMALIZATION
9. INTERPOLATION VALUES, MASKS AND MAPS
10. PROCESS FLOW
11. IMPLEMENTATION MECHANISMS—HARDWARE OVERVIEW
12. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Content creators/colorists may need to produce multiple versions of the same image content, each of the multiple versions being customized for presentation on a class of display in a plurality of different classes of displays. As used herein, a class of displays may refer to one or more display devices with similar display capabilities and/or to be used in similar viewing environments. Examples of classes of displays may include, without limitation, displays used in cinema, home theatre, outdoor displays, mobile classes of devices, etc. Images in each individual version of the same content may be creatively manipulated, in order to achieve a desired "look" when the images are rendered by a corresponding class of displays. Manipulation to achieve a desired "look" may include performing, based on the same image content, one or more operations adjusting tones, colors, saturation, contrast, shadows, highlights, etc., for each individual version. As used herein, the term "same image content" or "same content" refers to scenes, objects, figures, backgrounds, spatial relationships, etc., that are derived directly or indirectly from the same source content, albeit different versions of the same content may have variations in terms of image qualities, spatial resolutions, dynamic ranges, etc. The term "look" may refer to specific visual or perceptual quality of rendered images in a version of image content.

As the number of display devices increases, the cost and complexity of producing multiple versions of the same content for multiple classes of displays also increases. Techniques as described herein may be used to produce multiple versions of the same content targeted for different classes of displays with relatively high efficiency in comparison with other techniques.

As used herein, the term "being targeted for a class of displays" may refer to optimizing, adapting, adjusting, customizing, or creatively editing images in a version of content based on display capabilities of the class of displays in order to achieve a desired "look".

Under techniques as described herein, two or more (e.g., source) versions of the same content may be used to generate additional (e.g., derived) versions of the same content, each of the source and derived versions being targeted for a different class of displays. A derived version may be generated by interpolating two or more (existing) source versions based on interpolation parameters. The interpolation parameters may include similarity measures that indicate how close the derived version is to each of the source versions. Contributions from the source versions to the derived version may be determined by the similarity measures.

In some embodiments, additional image processing operations may be performed on the interpolated result (e.g., the derived version mentioned above) for the purpose of achieving a desired "look". Color grading operations or other image processing operations (e.g., as depicted with FIG. 4) may be further performed on the derived version to generate or to improve the "look" for a targeted class of displays. Since the derived version obtained with interpolation is much closer to the desired "look" than the source versions, a content creator/colorist is able to fine-tune the interpolated result with relatively less work. Examples of fine-tuning may include, without limitation, adjusting one or more similarity measures (e.g., existing ones used in interpolation, or new ones specifically introduced in the fine-tuning processes).

Under other techniques, operator errors may be easily generated when a version (e.g., one of the source versions) given to the content creator/colorist for adjustment as a starting point is widely apart from the desired "look" for a targeted class of displays.

In contrast, techniques as described herein provide a derived version that is much closer to the desired "look" than the source versions. Operator errors may be significantly reduced because much adjustment has been completed with interpolation automatically. Only relatively fine control over the look of the derived version may be exercised by a content creator/colorist. Once the derived version is deemed to achieve the desired look for the targeted class of displays, the finalized version, along with interpolation parameters, adjustment parameters, and/or a display description for the targeted class of displays may be archived and/or provided to downstream recipient devices. Additionally, efficiency is significantly improved under techniques as described herein, since the amount of adjustment required to produce the desired "look" on the version may be minimized, and may be much less than working from a version (e.g., an enhanced dynamic range version, VDR, generated by a content creator/colorist from RAW images) that is widely apart from the final version.

Additional versions of the same content for additional classes of displays may be produced following the same process that produces the derived version as discussed above. Additionally, optionally, or alternatively, two or more versions may be selected as source versions among a plurality of available versions, including any newly derived versions or any newly fined tuned versions, to produce a derived version for a targeted class of displays. The selection of the versions may be based on a similarity in classes of displays involved. For example, to produce a derived version, the closest versions among a plurality of available versions may be selected as the source versions to be interpolated to produce the derived version. Consequently, each subsequent version (or grade) may require less time than otherwise, further increasing efficiency in operation. Additionally, optionally or alternatively, none, some or all of the operations in deriving one or more additional versions may be performed by a content version creation system as described herein in series, in parallel, or in part parallel and in part series.

In some embodiments, mechanisms as described herein form a part of an image processing system, including but not limited to: a server, studio system, art director system, image editor, color grading or mastering tool, professional reference monitor, animation system, movie studio system, theater systems, cameras, TVs, broadcast system, media recording device, media playing device, video projector, screen (e.g., matte screen, gray screen, silver lenticular screen or the like), laptop computer, netbook computer, tablet computer, cellular radiotelephone, electronic book reader, point of sale terminal, desktop computer, computer workstation, computer kiosk, or various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Versions of Content and Classes of Displays

FIG. 1 depicts an example configuration in which two source versions of the same content are used to generate additional versions of the same content, in accordance with an embodiment. As depicted, a first version (e.g., a first color grade) of the same content may comprise first images (e.g., first image-1 102-1, . . . , first image-I 102-I) targeted for a first class of displays, where I is a positive integer greater than one. Similarly, a second version (e.g., a second color grade) of the same content may comprise second images (e.g., second image-1 104-1, . . . , second image-J 104-J) targeted for a second different class of displays, where J is a positive integer greater than one.

Figure 4:
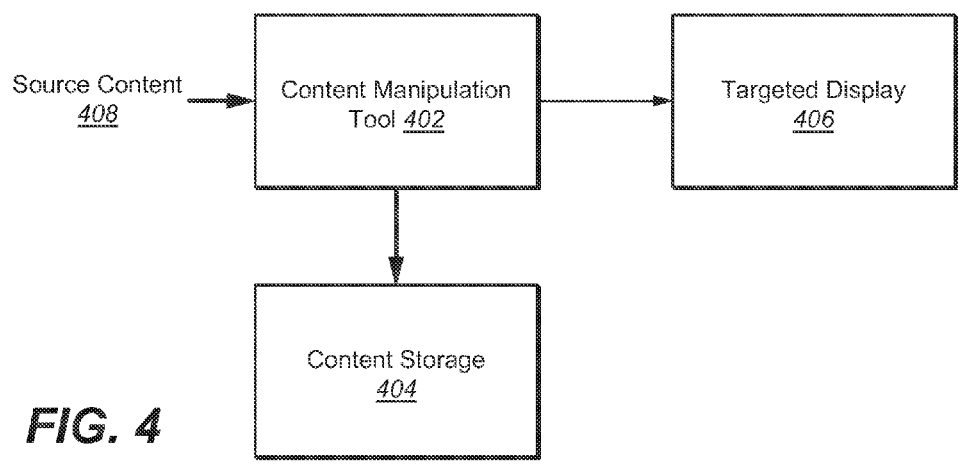
FIG. 4 depicts example content manipulation, in accordance with an embodiment.

In some embodiments, one or both of the first version and the second version may be created by a content creator/colorist using a color grading tool. FIG. 4 depicts example content manipulation, in accordance with an embodiment. For example, source content 408 (e.g., from a camera system, from a server, etc.) may be imported into a content manipulation tool 402 such as a color grading tool. The content manipulation tool 402 may be a part of a content version creation system and may operate in conjunction with a targeted display 406 (e.g., a high dynamic range (HDR) display, a Rec. 709 display, etc.) in a specific class of displays. The source content 408 may be, but is not limited to, ungraded visual materials from camera or film scan (e.g., RAW images), content that has been rendered into an interchange format (such as DPX or ACES), or content that has been previously adjusted/altered/graded for a display (such as film, Blu-ray). Images decoded from the source content 408 may be rendered on the targeted display 406. While watching the rendered images on the targeted display 406, the content creator/colorist manipulates and adjusts the source content 408 to achieve a desired "look" for the targeted display. When complete, the manipulated source content (which, for example, may comprise the first images 102-1 through 102-I of FIG. 1) along with adjustment parameters used in content manipulation and/or a description of a related class (e.g., a first class) of displays, may be archived in content storage 404.

This process may be repeated to generate more than one version of content. For example, one or both of the first version and the second version of FIG. 1 may be created in a similar manner to what has been described. Additionally, optionally or alternatively, content in a version that is automatically generated from other versions may be manipulated by a content creator/colorist in a similar manner before the version is finalized and/or released. Different targeted displays may be used when content in different versions is manipulated.

In some embodiments, at least one of the two or more source versions (e.g., the first version and the second version) may be created from the others of the two or more source versions. For example, a content creator/colorist may create the first version as depicted in FIG. 4, and proceed to adjust the first version of the content to create the second version of the content that achieves a desired "look" for the second class of displays. Additionally, optionally or alternatively, one (e.g., the second version) of the two or more source versions may be automatically generated or mapped for a class of displays based on other versions instead of being manually created by a content creator/colorist.

3. Content Version Creation

Two or more source versions may be interpolated to generate derived versions. A derived version may comprise contributions from each of the source versions that are interpolated. Referring back to FIG. 1, a third version (or grade) of content comprising third different images (e.g., third image-1 106-1, . . . , third image-K 106-K, where K is an integer greater than one) may be generated by interpolating the first and second versions. The third images (106-1 through 106-K) may be targeted for a third different class of displays. The third class may be different from each of the first and second classes of displays. If respective frame rates and/or spatial resolutions of the first version, the second version and the third version are different, time-wise or spatial domain sampling may be performed as a part of, or in addition to, interpolation.

Multiple versions (e.g., fourth image-1 108-1, . . . , fourth image-L 108-L, where L is an integer greater than one) of the same content may be generated with interpolation of a common set of source versions, if so desired. Additionally, optionally or alternatively, an earlier derived version may be used as a source version in subsequent interpolation operations for the purpose of creating later derived versions.

Figure 5:
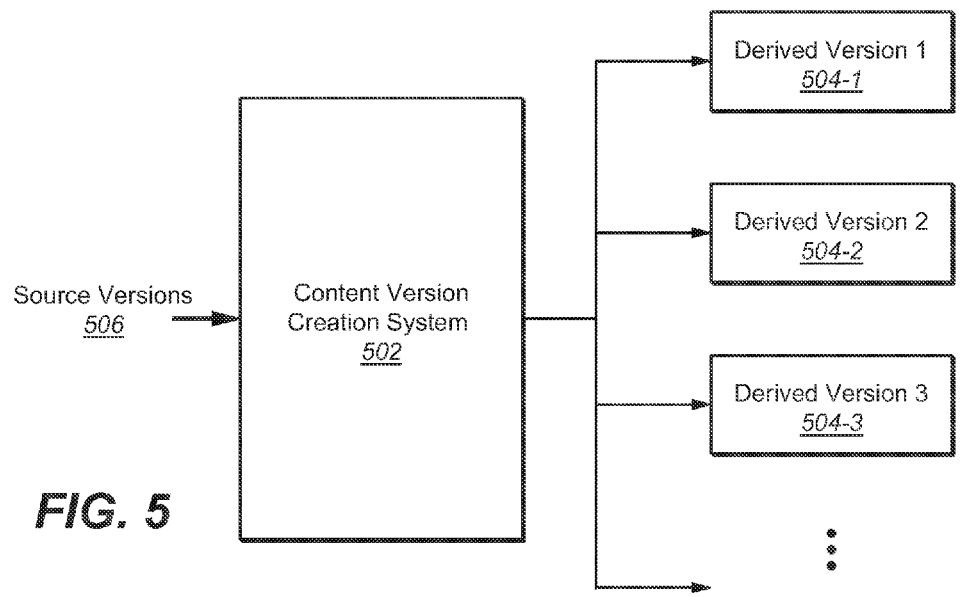
FIG. 5 depicts an example content version creation system (502), in accordance with an embodiment.

FIG. 5 depicts an example content version creation system (502), in accordance with an embodiment. The content version creation system (502) may be configured to import source versions 506. These source versions may be imported along with their respective display class descriptions and/or adjustment parameters.

In some embodiments, respective display class descriptions and/or adjustment parameters of a targeted class (e.g., one of derived version 1 504-1, derived version 2 504-2, derived version 3 504-3, etc.) of displays may be compared with display class descriptions and/or adjustment parameters of classes of displays for the source versions 506 to determine a set of interpolation parameters that govern what contributions are to be made to additional versions by the involved source versions, respectively.

For example, the source versions 506 may include, without limitation, the first version comprising the first images 102-1 through 102-I, and the second version comprising the second images 104-1 through 1044. The derived versions 504-1 may be the third version comprising the third images 106-1 through 106-K. Display class descriptions and/or adjustment parameters of the third class of displays may be compared with display class descriptions and/or adjustment parameters of the first and second classes of displays. A similarity measure may be generated based on the results of this comparison. The similarity measure may be used as interpolation parameters that govern what contributions are to be made to the third version of the content by the first and second versions of the content, respectively.

4. Similarity Measures

For the purpose of illustration only, the first class of displays may be described as having minimum and maximum luminance values (e.g., denoted as VDRmax and VDRmin, respectively) of 0.005 nits and 4000 nits, respectively. The second class of display may be described as having minimum and maximum luminance values (e.g., denoted as SDRmax and SDRmin, respectively) of 0.005 nits and 120 nits, respectively. The third (e.g., target) class of display may be described as having minimum and maximum luminance values (e.g., denoted as Tmax and Tmin, respectively) of 0.005 nits and 600 nits, respectively. Additionally, optionally, or alternatively, the first, second, and third classes of displays may be associated with their respective viewing environments. The first class of displays (VDR displays in the present example) may be described as having an ambient luminance value (denoted as VDRamb) of 10 nits; the second class of displays (SDR displays in the present example) may be described as having an ambient luminance value (denoted as SDRamb) of 10 nits; the third class of displays (target displays in the present example) may be described as having an ambient luminance value (denoted as Tamb) of 10 nits.

An example similarity measure that may be used to determine what contributions are to be made to the third version by the first and second versions, respectively, may be determined as follows. Initially, mid-point luminance values of each of the first, second, and third classes of displays may be determined. Different ways of defining or computing a mid-point luminance of a class of displays may be used in various embodiments. For example, mid-point luminance values (e.g., denoted as VDRmid, SDRmid and Tmid, respectively) of the first, second and third classes of displays may be defined or computed as follows:

$$VDRmid = sqrt(VDRmax * VDRmin) = 4.5 \text{ nits}$$

$$SDRmid = sqrt(SDRmax * SDRmin) = 0.71 \text{ nits}$$

$$Tmid = sqrt(Tmax * Tmin) = 1.7 \text{ nits} \tag{1}$$

The mid-point luminance values may be compared, for example, through ratios, to generate a similarity measure (e.g., denoted as alpha) as follows:

$$alpha = (\log 10(Tmid/VDRmid)/\log 10(SDRmid/VDRmid)) = 0.51 \tag{2}$$

In some embodiments, descriptions of classes of displays include, without limitation, ambient light levels of viewing environments. Additionally, optionally, or alternatively, mid-point luminance values and similarity measures may be determined based at least in part on the ambient light levels. For example, mid-point luminance values of the first, second and third classes of displays may be defined or computed as follows:

$$VDRmid=sqrt(sqrt(VDRmax*VDRmin)*VDRamb)$$
$$=6.7 \text{ nits}$$

$$SDRmid=sqrt(sqrt(SDRmax*SDRmin)*SDRamb)=2.7 \text{ nits}$$

$$Tmid=sqrt(sqrt(Tmax*Tmin)*Tamb)=4.2 \text{ nits} \quad (3)$$

A similarity measure may be determined based on alternative mid-point luminance values from expressions (3), instead of the mid-point luminance values from expressions (1). For example, the mid-point luminance values computed with formulas in expressions (3) may be used in the formula of expression (2) to derive an alternative value (which may be different from 0.51 obtained without consideration of ambient light) for the similarity measure.

Zero, one, or more of similarity measures other than those based on mid-luminance values may be used to determine contributions of versions of particular content in a derived version of the same content. Additionally, optionally, or alternatively, multiple similarity measures may be used to determine contributions of versions of particular content in a derived version of the same content. For example, the alpha value above may be used to indicate similarity in lightness or luminance, while another value may be used to indicate similarity in color gamut. One (e.g., denoted as beta) of various ways to indicate similarity in color gamut may be computed based on results of comparing respective areas of chromaticities of classes of displays, for example, as follows:

$$beta=(\log 10(Tarea/VDRarea)/\log 10(SDRarea/VDRarea)) \quad (4)$$

where VDRarea, SDRarea and Tarea denote the areas of chromaticities of the first, second and third classes of displays, respectively. Additionally, optionally, or alternatively, color gamut volumes may be used to compute one or more similarity measures that indicate similarity in color gamut.

One or more similarity measures may be used to interpolate among two or more source versions of content to produce one or more additional versions of the same content. For example, the third version of content may be produced with interpolation using one or more interpolation parameters, which may include, without limitation, one or more of the similarity measures.

A plurality of similarity measures may be concurrently used in interpolating two or more source versions. For example, a derived version may be generated based on example expressions as follows:

$$Luma=alpha*SDRLuma+(1-alpha)*VDRLuma$$

$$Pb=beta*SDRPb+(1-beta)*VDRPb;$$

$$Pr=beta*SDRPr+(1-beta)*VDRPr; \quad (5)$$

where VDRLuma, SDRLuma and Luma denote luminance values of the first, second and third classes of displays, respectively; VDRPb, SDRPb and Pb denote Pb color channel values of the first, second and third classes of displays, respectively; and VDRPr, SDRPr and Pr denote Pr color channel values of the first, second and third classes of displays, respectively.

Interpolation may be performed in any color space. Interpolating source versions may be performed in an YPbPr color space as shown in expressions (5) above. However, any other color spaces such as a RGB color space may also be used to perform interpolation of source versions.

Figure 2:
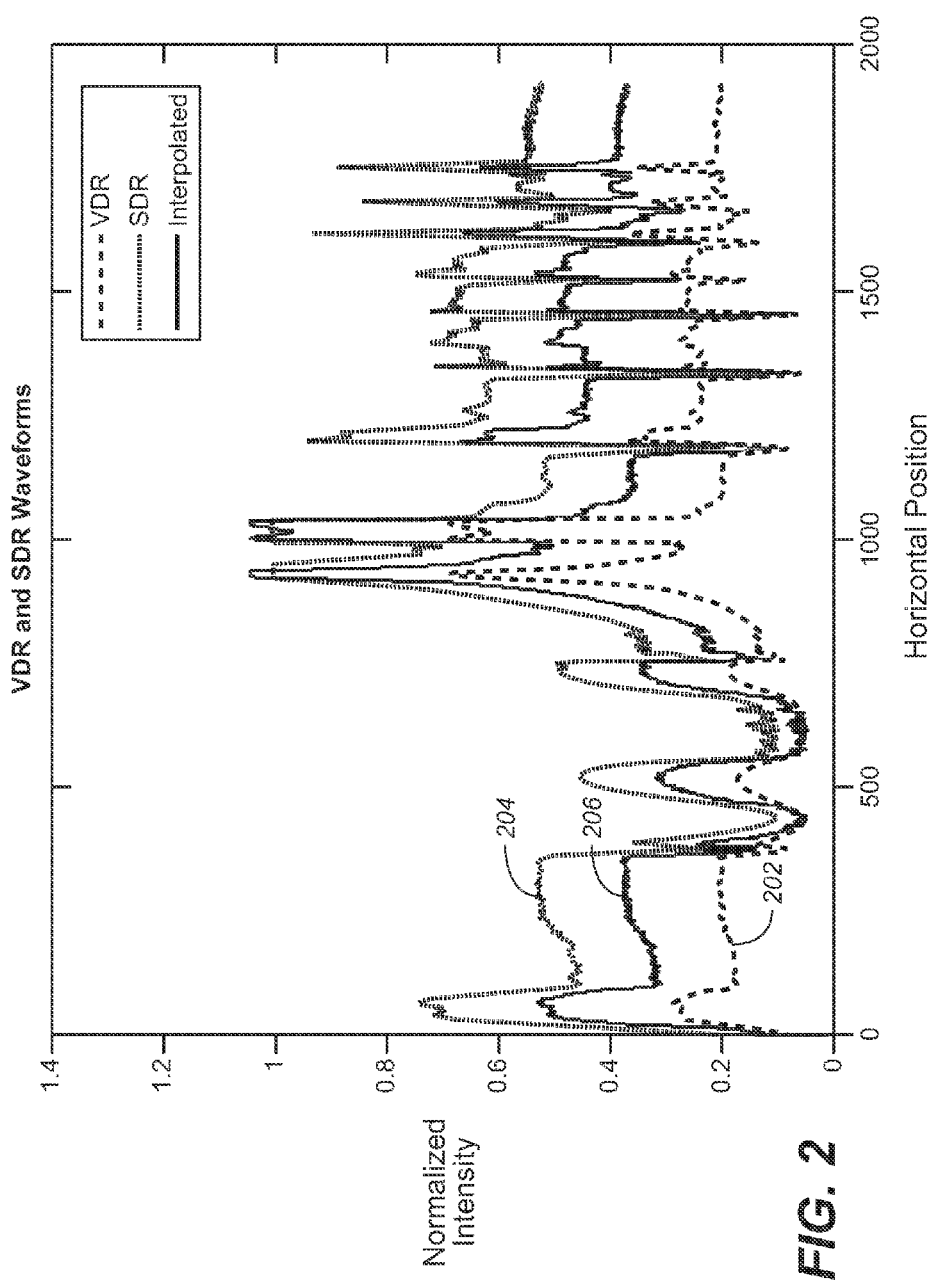
FIG. 2 depicts an example scanline of a derived version generated by interpolating scanlines of two source versions, in accordance with an embodiment.

FIG. 2 depicts an example scanline generated by interpolating scanlines of two source versions (e.g., the first and second versions), in accordance with an embodiment. Interpolation as described herein may be performed in a spatial domain, a frequency domain, one of a variety of transform domains, etc. As used herein, the waveform of a depicted scanline may represent pixel values (e.g., code values or normalized intensity values) across a scanline of an image (e.g., a 1920×1080 image). The horizontal axis may represent horizontal pixel positions along the scanline.

In some embodiments, for the same content, a scanline in an image of the third version of content (depicting a cockpit with areas of intensive highlights) may correspond to one or more first scanlines in one or more first images in the first version of the same content. The scanline in the image of the third version of the content and the first scanlines in the first images of the first version of the content may further correspond to one or more second scanlines in one or more second images of the second version of the same content. If scanlines or images between different versions are not mapped 1-1, spatial and time-wise sampling operations may be performed in conjunction with interpolation to generate the scanline in the image of the third version based on the first scanlines of the first images of the first version and the second scanlines of the second images of the second version.

As depicted, a scanline (206) of an image of the third version of the content may be generated by interpolating a first scanline (202) of a first image of the first (e.g., VDR) version of the content and a second scanline (204) of a second image of the second (e.g., SDR) version of the content.

The pixel values or luminance values in the scanlines (202, 204, and 206) as depicted in FIG. 2 may be relative values. For example, a VDR version may support a much higher maximum (or peak) VDR luminance value (e.g., 4000 nits) than a maximum (or peak) SDR luminance value (e.g., 100 nits) supported by a SDR version. A relative VDR luminance value represented in the first scanline (202) may be derived by dividing a corresponding absolute VDR value (e.g., 800 nits) over the maximum VDR luminance value (4000 nits), equaling to 20% or 0.2. On the other hand, a relative SDR luminance value represented in the second scanline (204) may be derived by dividing a corresponding absolute SDR value (e.g., 60 nits) over the maximum SDR luminance value (100 nits), equaling to 60% or 0.6. As can be seen, even though the absolute VDR luminance value (800 nits) is much higher than the absolute SDR luminance value (60 nits), the relative VDR luminance value is still smaller than the relative SDR luminance value, due to the fact that the VDR version supports a much wider luminance value range than the SDR version.

5. Content Version Distribution

After a plurality of versions (or grades) of the same content has been created, a wide variety of media packaging methods may be used to distribute one, two, or more versions of the same content in one or more media packages. A version of the content may be distributed either individually or in combination with one or more other versions of the same content in a media package.

Figure 6:
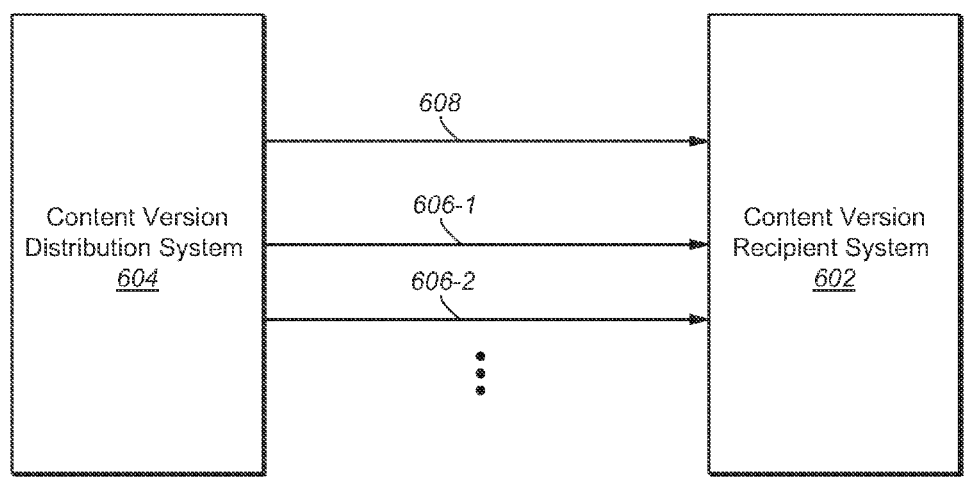
FIG. 6 depicts example distribution of versions of the same content from a content version distribution system to a content version recipient system, in accordance with an embodiment.

FIG. 6 depicts an example distribution of versions of the same content from a content version distribution system (604) to a content version recipient system (602), in accordance with an embodiment. The content version distribution system (604) may be a part of a content version creation system.

Alternatively, the content version distribution system (604) may be separate from a content version creation system and may be configured to receive a plurality of versions of the same content for distribution, for example, from media data storage or from the content version creation system directly.

In an example, one version (e.g., the first version) of image content for a particular class of displays may be encoded, for example, into signals in one or more bitstream layers or media containers based on standard and/or proprietary specifications. Image reconstruction data for one or more of additional version(s) (e.g., the second version, third version, etc.) for additional classes of displays may be provided to downstream media devices on top of the encoded version. Examples of image reconstruction data may include, without limitation, one or more of difference data, residue data, adjustment parameters, operational parameters, mapping parameters, quantization parameters, look-up tables (LUTs), polynomial coefficients, segmentation information, etc.

As depicted in FIG. 6, in some embodiments, an encoded version is provided in a base layer (608), while some or all of the image reconstruction data for reconstructing additional versions of displays may be provided in one or more enhancement layers 606-1, 606-2, etc. (including but not limited to one or more reference data unit layers).

In some embodiments, image reconstruction data may comprise one or more of the parameters (e.g., similarity measures, interpolation parameters, descriptions of classes of displays, etc.) applied in the content creation (e.g., creation of intermediate versions or grades as previously discussed).

A recipient media device such as the content version recipient system 602 of FIG. 6 may be configured to decode the encoded version and reconstruct a version of the content for the particular class of displays. Additionally, optionally, or alternatively, the recipient media device may be configured to decode the image reconstruction data and reconstruct additional versions of the same content for the additional classes of displays based on the image reconstruction data and the encoded version, or based on the decoded results thereof. For example, the recipient media device (or video/image decoder) may be configured to decode a first version from received encoded image data, predict a second version, and then interpolate between the two (or more) versions to optimize content for display on a target class of displays.

6. Clipped Image Values

A version of content as described herein may use a code space of certain bit depth (8 bits, 10 bits, 11 bits, 12 bits, 14 bits, or another smaller or larger bit depth value) for a particular color channel of a color space used to encode pixel values. A version of image content (e.g., a SDR version, or the second version in the previous example) may comprise clipped image values. The clipped image values may occur as a result of (e.g., tone) mapping a version of the content that uses a higher bit depth code space (e.g., 14 bits) to a version of the content that uses a lower bit depth code space (e.g., 8 bit) to encode pixel values or color channels therein.

In some embodiments, an out-of-range image value may be "clipped" to a maximum image value representable in the lower bit depth code space or "crushed" (or "clipped") to a minimum value representable in the lower bit depth code space. Clipped image values may be especially likely to occur in a version of the image content that is targeted for a class (e.g., the second class of displays in the previous example) of displays with the least display capability (e.g., SDR displays, mobile devices, etc.).

When regions containing clipped image values in the version of the image content is interpolated with another version (e.g., a VDR version, or the first version in the previous example) of the same image content to generate a derived version (e.g., the third version in the previous example) of the content for a third class of displays, image values in the derived version may not be correct, because the clipped image values are incorrect image values. This may happen even when some or all of the image values, if generated based on unclipped image values, might not be out-of-range with respect to the code space that encodes image data in the derived version of the image content. Therefore, interpolating with clipped image values from a source version may likely cause unnecessary degradation in a derived version.

7. Alternative Versions of Content

In some embodiments, in addition to a (canonical) version for a class of displays, an alternative version of content may be defined for the class of displays. The alternative version of content may be configured with specific mechanisms or attendant data storages to store (unclipped) image values that have been clipped in the canonical version. In some embodiments, the alternative version of content may be configured with an alternative color space of a higher bit depth than a lower bit depth of a color space for the version of content for the class of displays. For example, the alternative version of content may use a 9 bit code space instead of an 8 bit code space which may be used by the version of content. In some embodiments, mapping (e.g., 1-1) may be defined between the lower bit code space of the canonical version and a portion of the higher bit code space of the alternative version. The remaining portion of the higher bit code space of the alternative version may be used to store unclipped values.

Suppose that a version of content for a class of displays is configured to support a representable range (or simply denoted as [0:1]) between zero (0) and one (1) in a 12-bit code space. The class of displays may be expected to support the 12-bit code space in their rendering operations; values exceeding or under the representable range are either clipped or crushed. In some embodiments, 12 bit image values may be multiplied with 4095, offset by (or added with) 4095, and then saved as 16 bit unsigned integers in an alternative version. This allows the archival of image values between −100% and +1500% (or [−1:15]) of the representable range in the 12-bit code space in the alternative version.

An alternative version of the content may be created with an alternative representable value range that is a superset of the representable value range between zero (0) and one (1) of the version of the content. Image values outside the representable value range may still be representable with the alternative representable value range, which is a superset of the former range.

Additionally, optionally or alternatively, a higher code space need not be defined for an alternative version of content. Instead, some or all of unclipped image values corresponding to a clipped image value for a version of the same content may be stored within a specific attendant data storage. The specific attendant data storage (e.g., hash) may be configured to represent these unclipped image values. In the meantime, the alternative version may be configured to keep other image values in the low bit depth.

In some embodiments, instead of storing a complete set of image values, an alternative version of content may store some (e.g., only clipped image values) but not all image values in a corresponding version of the same content.

In some embodiments, unclipped image values corresponding to clipped image values in a version of content for a class of displays may be accessed and interpolated with unclipped image values of another version of the same content for another class of displays to generate a derived version of the same content for a third class of displays.

In some embodiments, the class of displays may be configured to support only the lower bit code space. In some embodiments, the alternative version of content may be internal to a content version creation system that implements techniques as described herein only, and may not be released for rendering on a display in the class of displays. In these embodiments, a content version creation system as described herein is configured to maintain internally a (canonical) version and an alternative version of the content for the class of displays.

The alternative version of content may be releasable to a display in the class of displays, if such a display is configured to handle unclipped image values (e.g., by clipping or by crushing out-of-range values as compared with the representable ranges in the lower-bit code space). In some embodiments, clipping may be prevented during creation of a version of content. Instead of clipping image values to a range (e.g., between 0 and 1) that represents display capabilities of a class of displays, the image values may be internally represented as outside the range, and only clipped before rendering images with the image values. In these embodiments, a content version creation system as described herein is configured to store a version of the content for the class of displays, even though the version may comprise image values that may have to be clipped or crushed in rendering operations.

8. Normalization

Normalization may be used in conjunction with content version creation and distribution. "Dynamic range normalization processing" or simply "normalization" as described herein denotes a process to prepare image or video data for backwards-compatible delivery in video distribution systems, such as video broadcasting or digital cinema. The input to a normalization process comprises two digital video signals, typically a standard dynamic range signal (SDR) and an enhanced dynamic range signal (e.g., VDR). The normalization process produces a first normalized digital signal (e.g., SDR*) and a second normalized digital signal (e.g., VDR*), where the second normalized digital cinema signal is visually identical to the input VDR signal. The normalization process allows the SDR* and VDR* signals to be related by invertible mapping. Example embodiments of deriving normalization mapping parameters as described herein are described in U.S. Provisional Application 61/576,141, filed Dec. 15, 2011, "Backwards-compatible delivery of digital cinema content with extended range and related preprocessing and coding methods", incorporated herein by reference in its entirety.

In an example, image data packaged in a release may first be normalized for the purpose of reducing or even eliminating residuals. This increases the distribution efficiency further. In another example, interpolation of source versions may be performed with a normalized version for the purpose of remedying clipped values in a version.

A normalization operator based on a normalization matrix and/or parameterized curves may be used to map a first version (e.g., a VDR version) of image content for a first class (e.g., a VDR class) of displays to a normalized second version (e.g., a SDR* version) of the same image content for a second class (e.g., a SDR class) of displays. The normalized second version (SDR*) may be perceptually the same as, or substantially similar to, a second version (e.g., a SDR version) of the same image content for a second class (e.g., a SDR class) of displays. The normalization matrix and/or parameterized curves may be provided to downstream devices as part of image reconstruction data for reconstructing one version (e.g., one of SDR version and VDR version) from another version (e.g., the other of SDR version and VDR version).

Figure 3:
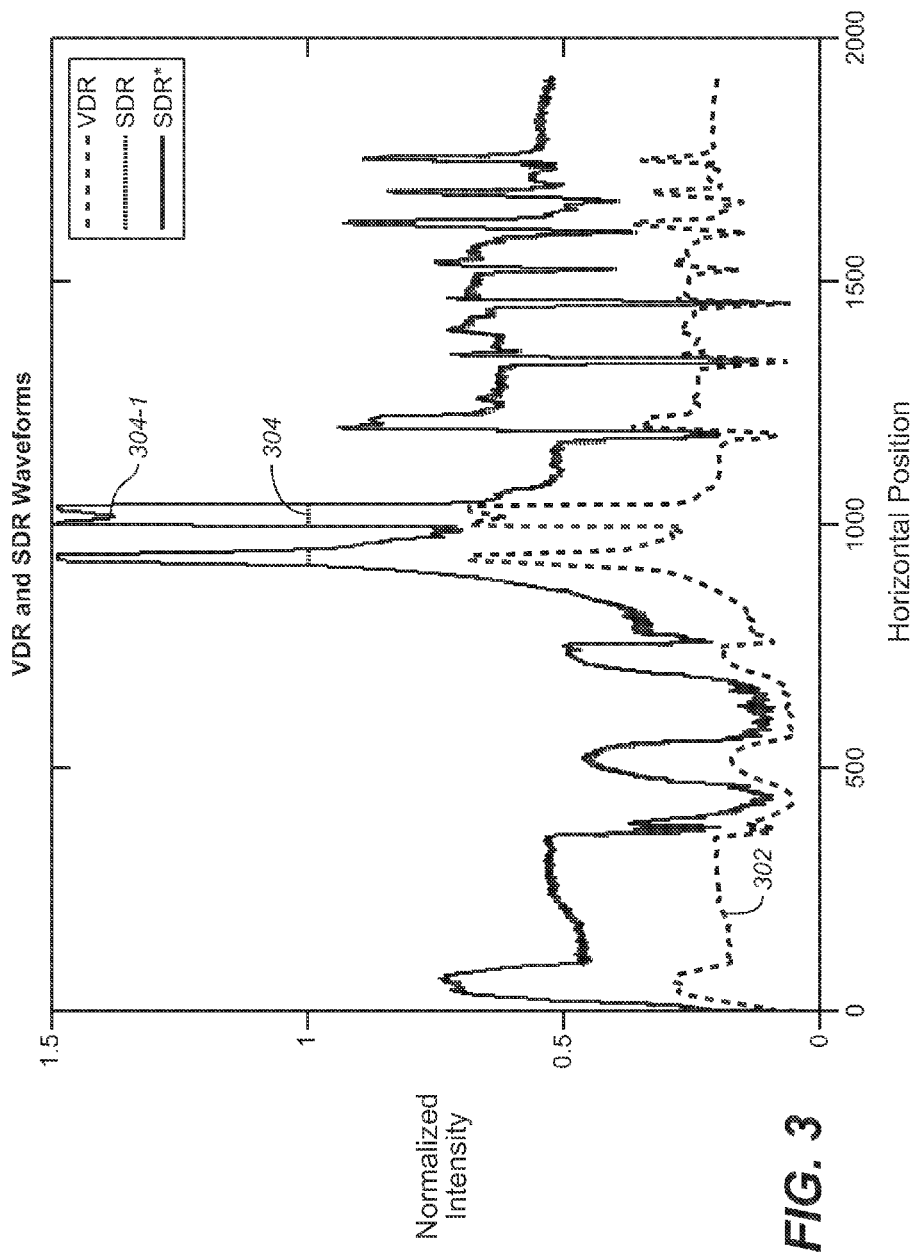
FIG. 3 illustrates an example normalized scanline along with a first scanline in a first version of the same content and a second scanline in a second version of the same content.

In some embodiments, the normalized second version is virtually the same as the actual second version or grade, but may contain information that was clipped in the second version. FIG. 3 illustrates an example normalized scanline (304-1) in a normalized (second) version (SDR*) of content along with a first scanline (302) in a first version (VDR) of the same content and a second scanline (304) in a second version (SDR) of the same content. The example normalized scanline (304-1), which may be targeted for the second class of displays, captures image values without clipping, whereas the second scanline (304), which may be targeted also for the second class of displays, captures image values below 1.0 without clipping but loses all the highlights corresponding to image values higher than 1.0. Thus, the normalized second version (SDR*) may be generated to restore details that may be lost in the highlights in the second version (SDR).

Normalization may be performed by applying a normalization operator f( . . . ) to a version (e.g., with image data represented in a high bit depth code space) of content to derive a normalized version of the same content. In the present example in which the version to be applied with the normalization operator is the VDR version and the version in which clipping occurs is the SDR version, the normalization second version (SDR*) may be derived as follows:

$$SDR^* = f(VDR^*) \tag{6}$$

The normalization operator f( . . . ) may be specified with a normalization matrix (which may be invertible). There may exist many possible mappings or possible sets of values for a normalization matrix from the VDR/SDR version to the SDR*/VDR* version. Optimized values (e.g., best-fit values) in the normalization matrix may be obtained by minimizing errors (e.g., an error function in a L2 form, etc.) between a normalized version (e.g., SDR*) and a clipped version (e.g., SDR) for unclipped regions in SDR, with one or more constraints used to preserve detail otherwise lost in the clipped regions in SDR.

In some embodiments, minimizing errors for every individual pixel may bias the solution for the optimized values for the normalization matrix and/or parameterized curves towards larger spatial features comprising a larger number of pixels as compared with other spatial features that may comprise fewer pixels. As a result, small contextually important features with a relatively few pixels may be inappropriately deemphasized and errors in the pixels constituting these small important features may be relatively high in relation to other features. This may happen when the errors for the small features, even though very high, represent small contributions to overall errors in the whole image due to small spatial sizes of the small features. For example, with a small red feature on a mostly blue image, a normalization matrix may be optimized for the mostly blue pixels, but may not be so for the red pixels.

In some embodiments, clustering and saliency may be used to improve normalization. Pixels in an image to be normalized may be clustered before searching for optimized values used in normalization. One or more of a wide variety of clustering algorithms, such as K-means clustering, may be used to cluster pixels. A clustering algorithm may be configured to segment or classify pixels in an image into clusters of like pixels. As used herein, likeness of pixels may be determined based on one or more of a variety of criteria including but not limited to: luminance values, color values, spatial locations, etc. Representative pixel values may be extracted from or determined based on pixel values of one or more of the clusters of like pixels. Searching for optimized values used in normalization may be performed on a (e.g., greatly)

reduced data set comprising representative pixel values of the clusters of like pixels. This not only accelerates optimization computation for normalization, but also improves results. For example, comparable weighting may be assigned to different clusters of like pixels of all different colors and/or luminance, independent of or less dependent on frequencies of occurrences of these pixels in an image.

In some embodiments, saliency of image features may be used to weigh error contributions of pixels. Clusters of pixels or like pixels may be weighed based on size and/or saliency. For example, a cluster corresponding to a face may be deemed as more important (more salient) than a cluster corresponding to a flower; the weighting on the face may therefore be higher when optimizing values to be used in normalization. A saliency map of an image may be generated using an automated saliency algorithm, and may be combined with a cluster map (e.g., generated by a clustering algorithm) to generate a weighted cluster map. Optimizing values used in normalization may be based on the weighted cluster map. As a result, normalization may be configured to capture better contextual information than otherwise (e.g., the per-pixel normalization).

In some embodiments, a first version associated with a higher bit depth code space may be used or accessed to create a normalized version for a class of displays. Additionally, optionally or alternatively, a second version associated with a lower bit depth code space and targeted for the class of displays may be available. To derive a third version, the first version may be interpolated with one or more of the normalized (second) version or the second version.

9. Interpolation Values, Masks and Maps

Interpolating two versions of the same content to derive a third version of the same content may not be restricted to a single interpolation parameter or one or more interpolation parameters that remain constant. It may be desirable to interpolate the two versions with different weights for different luminance ranges using one or more interpolation parameters that may vary with luminance values. An interpolation parameter may be represented with a function of individual or aggregate image values in one or more (initial) versions based on which interpolation operations are performed to generate a derived version. For example, a similarity measure alpha may be 0.25 in dark image portions, 0.5 in mid-tone image portions, and 0.75 in highlight image portions.

An example expression of using a similarity measure (e.g., alpha) with a plurality of values to generate a derived version from source versions may be as follows:

$$\text{Luma}=\text{alphaLUT}(SDR\text{Luma})*SDR\text{Luma}+(1-\text{alphaLUT}(SDR\text{Luma}))*VDR\text{Luma} \quad (7)$$

where alphaLUT(SDRLuma) represents an operation of selecting a value among similarity measure values stored in a look-up table (LUT); the LUT in this example depends on image values (e.g., SDRLuma) in the SDR version.

Instead of performing selecting interpolation parameter values from a LUT during interpolation, an image mask may be created beforehand, for example, as follows:

$$\text{alphamask}=\text{alphaLUT}(SDR\text{Luma}) \quad (8)$$

$$\text{Luma}=\text{alphamask}*SDR\text{Luma}+(1-\text{alphamask})*VDR\text{Luma} \quad (9)$$

where alphamask may comprise explicit or implicit interpolation parameter values (or interpolation weighting) that have been retrieved from the LUT.

Values of an interpolation parameter may be not only represented with a LUT, but also represented with other forms. For example, the similarity measure alpha may be given with a parameterized curve as follows:

$$\text{alpha}=g(SDR\text{Luma}, \text{parameters}) \quad (10)$$

wherein "parameters" represent one or more parameters used to control the contour or shape of the parameterized curve or curve segments therein.

Additionally, optionally or alternatively, a content version creation system may be configured to provide a content creator/colorist an ability to apply various interpolation parameter values such as various levels of the similarity measure alpha. In an example, the content creator/colorist may turn a dial which adjusts overall interpolation weighting factors for all image portions. In another example, the content creator/colorist may turn a dial which adjusts interpolation weighting factors for dark image portions, or another dial which adjusts just interpolation weighting factors for mid-tone image portions.

An interpolation parameter may vary spatially. The interpolation parameter may have different values (e.g., interpolation weighting) at different spatial locations inside an image frame. In an example, a content creator/colorist may wish to adjust interpolation weighting higher or lower just for one or more specific objects in a scene (which may comprise one or more images in each version) in relation to other image portions in the scene. A content version creation system may be configured to receive user input (e.g., from a content creator/colorist) that selects a desired object whose interpolation weighting may be adjusted higher or lower relative to other image portions in the same image or in the same scene. Examples of user input may include, without limitation: mouse clicks, grazes with an eye graze tracking system, use of bounding shape outlining tools, etc. An interpolation map (e.g., denoted as alphamap) comprising interpolation parameter values may be created for each region of an image and/or scene. The interpolation map may be configured to conform to object boundaries, or to smoothly transition between different regions.

An example expression of using an interpolation map to generate a derived version from source versions may be as follows:

$$\text{Luma}=\text{alphamap}*SDR\text{Luma}+(1-\text{alphamap})*VDR\text{Luma} \quad (11)$$

Interpolation of (source) versions of the same content to derive additional versions may be performed in one or more of spatial domains, frequency domains, or other transform domains. Interpolation in a specific domain may be simpler and/or more efficient than otherwise, if the source versions have already been encoded and compressed in the specific domain. For example, if the source versions are already encoded in a frequency domain (such as FFT, DCT, etc.), rather than transforming to the source versions into a spatial domain, interpolating in the spatial domain, and then transforming back to the frequency domain, some or all of the operations including interpolation may be performed directly in the frequency domain.

A content version creation system or an image processing system may transform a version of content from a first domain to a second domain. For example, to render a derived version generated by interpolation of source versions in a transform domain, the derived version of the content may be transformed from the transformed domain to a spatial domain. However, since the interpolation of source versions is performed directly in the transform domain in which the source versions are encoded, an overall number of domain transformations may be reduced, for example, from two transformations to only one transformation. Furthermore, in some embodiments in which image data in a transform domain needs not be transformed into a spatial domain, domain transformation may be eliminated. In some embodiments, image data derived directly in a transform domain may be provided (e.g., created on the fly for broadcast) to downstream devices (e.g., a certain class of displays) that are capable of rendering the image data.

Interpolation parameters, such as interpolation values, interpolation masks, interpolation curves, interpolation maps, etc., may vary with content, and may be at least partially dependent on the content. In an example, a dark portion of an image may be assigned with a larger value for interpolation weighting than a bright portion of the image. In another example, scene statistics may be used to determine or adjust interpolation parameter values (or interpolation weighting). Additionally, optionally or alternatively, a predominantly dark image may have a different interpolation parameter value than a predominantly bright image. In some embodiments, darkness of images may be determined based on a mean luminance (arithmetic mean, geometric mean, mode, etc., of luminance values) and/or one or more coefficients in a transform domain that represents energy. A lower or higher mean (or coefficient value) may indicate a dark image in relation to other images. In these embodiments, the mean value may be used as a variable to determine or adjust an interpolation parameter value (interpolation weighting). Other examples of scene statistics may include, without limitation: histogram, standard deviation, kurtosis, etc.

Instead of varying interpolation parameters per image, interpolation parameters may vary with scenes, in order to improve temporal stability. Using scene-level interpolation parameters instead of frame-level interpolation parameters also reduces the number of interpolation parameter values, and hence reduces the total amount of metadata required for archival and distribution. For example, a movie may be divided into scenes, either manually or automatically. Each scene may then be analyzed to determine appropriate interpolation parameters. Values of the interpolation parameters may then be modified or adjusted on a per-scene basis programmatically or manually. Cross fading may be used in between scenes to smoothly transition a first set of interpolation parameter values for a first scene into a second set of interpolation parameter values for a second scene. The cross fading between the first and second scenes may last less than one second, greater than one second, etc.

10. Process Flow

FIG. 7A illustrates an example process flow according to an example embodiment of the present invention. In some example embodiments, one or more computing devices or components may perform this process flow. In block 702, an image processing system (e.g., 502 of FIG. 5 or 604 of FIG. 6) accesses first images in a first version of a particular image content, the first version being targeted for a first class of displays.

In block 704, the image processing system accesses second images in a second different version of the particular image content, the second version being targeted for a second different class of displays.

In block 706, the image processing system divides at least one of the first images and the second images into a plurality of clusters of pixels.

In block 708, the image processing system interpolates the first images and the second images to generate third different images for a third version of the particular image content using one or more interpolation parameters, the third version being targeted for a third different class of displays, at least one of the one or more interpolation parameters having two or more different values in two or more different clusters in the plurality of clusters of pixels.

FIG. 7B illustrates an example process flow according to an example embodiment of the present invention. In some example embodiments, one or more computing devices or components may perform this process flow. In block 722, an image processing system (e.g., 502 of FIG. 5 or 604 of FIG. 6) accesses first images in a first version of a particular image content, the first version being targeted for a first class of displays.

In block 724, the image processing system accesses second images in a second different version of the particular image content, the second version being targeted for a second different class of displays.

In block 726, the image processing system normalizes the first version into a normalized second version based on display characteristics of the second class of display.

In block 728, the image processing system interpolates the first images and at least one of the second images or the normalized second images to generate third different images for a third version of the particular image content using one or more interpolation parameters, the third version being targeted for a third different class of displays.

In an embodiment, the first version, the second version and the third version are of three different color grades, respectively.

In an embodiment, the third images are generated by further interpolating with a fourth different version of the particular image content, the fourth version being targeted for a fourth different class of displays.

In an embodiment, the second images are generated based at least in part on the first images.

In an embodiment, the normalized second images are obtained with a normalization operator, wherein values used by the normalization operator are optimized based on a parameterized normalization equation, wherein the normalization operator with the optimized values preserves one or more image details from the first images in corresponding normalized second images, and wherein the one or more image details preserved in the normalized second images are not preserved in the second images.

In an embodiment, the image processing system is further configured to optimize values used by a normalization operator based on a parameterized normalization equation for each individual cluster in the plurality of clusters. In an embodiment, at least two different clusters in the plurality of clusters are assigned at least two different weighting values. In an embodiment, the weighting values depend on one or more of: maximum luminance values, minimum luminance values, color gamut areas, color gamut volumes, ambient light levels, color channel values, pixel locations, etc. In an embodiment, the weighting values depend on whether a corresponding image portion represents one of: a mid-tone image portion, a dark image portion, a bright image portion, etc.

In an embodiment, the image processing system is further configured to transform at least one of the first images or the second images into an intermediate image based on one or more contrast sensitivity functions; and to generate at least one of the third images based at least in part on the intermediate image.

In an embodiment, each of a first subset of the first images and a first subset of the second images and a first subset of the third images comprises a first part of the particular image content; each of a second subset of the first images and a second subset of the second images and a second subset of the third images comprises a second part of the particular image content; the first subset of the third images is derived from the first subset of the first images and the first subset of the second images using a first set of interpolation parameters; and the second subset of the third images is derived from the second subset of the first images and the second subset of the second images using a second different set of interpolation parameters. In an embodiment, the first subset and the second subset of the third images represent two different scenes in the particular image content.

In an embodiment, at least one of the interpolation parameters depends on one or more of: maximum luminance values, minimum luminance values, color gamut areas, color gamut volumes, ambient light levels, color channel values, etc.

In an embodiment, the image processing system is further configured to identify an object and other image portions in one or more images of the first images or the second images; and to assign different interpolation parameter values to the object and the other image portions.

In an embodiment, the image processing system is further configured to analyze one or more of the first images or the second images; and to determine interpolation parameter values based at least in part on results of analyzing the one or more of the first images or the second images.

In an embodiment, the third images are derived with interpolation performed in one of: spatial domains, spatial frequency domains, time domains, a transform domain, etc.

In an embodiment, the third images are derived with interpolation using different sets of interpolation parameter values relating to: (a) one or more particular images of the first images, (b) one or more particular scenes of the first images, or (c) one or more images at or near one or more transitions of different scenes of the first images.

In an embodiment, one of the first and second versions represents a normalized version.

In an embodiment, the image processing system is further configured to encode the first images and one or more of interpolation parameters or normalization parameters into an output video signal.

In an embodiment, the interpolation parameters comprise at least one similarity measure based on one or more of: luminance values, color gamut areas, color gamut volumes, ambient light levels, etc.

In an embodiment, the third images are derived with interpolation performed in one of: YPbPr color spaces, RGB color spaces, or other standard-based or proprietary color spaces.

In an embodiment, the image processing system is further configured to interpolate one or more input images represented, received, transmitted, or stored with one or more input video signals into one or more output images represented, received, transmitted, or stored with one or more output video signals.

FIG. 7C illustrates an example process flow according to an example embodiment of the present invention. In some example embodiments, one or more computing devices or components may perform this process flow. In block 742, an image processing system (e.g., 602 of FIG. 6) decodes image data in one or more input video signals into first images in a first version of particular image content and one or more interpolation parameters, the first version being targeted for a first class of displays, at least one of the one or more interpolation parameters having two or more different values in two or more different clusters in a plurality of clusters of pixels in at least one of the first images.

In block 744, the image processing system reconstructs third images of the particular image content based at least in part on: the first images and the one or more interpolation parameters. The third images are targeted for a third different class of displays.

FIG. 7D illustrates an example process flow according to an example embodiment of the present invention. In some example embodiments, one or more computing devices or components may perform this process flow. In block 762, an image processing system (e.g., 602 of FIG. 6) decodes image data in one or more input video signals into first images in a first version of particular image content and one or more interpolation parameters and one or more normalization parameters, the first version being targeted for a first class of displays.

In block 764, the image processing system reconstructs third images of the particular image content that are targeted for a third different class of displays, based at least in part on the first images, the one or more interpolation parameters and the one or more normalization parameters.

In an embodiment, the image processing system is further configured to render the third images on a target display in the third class of displays.

Embodiments include an apparatus comprising a processor and configured to perform any one of the foregoing methods as discussed above.

Embodiments include a computer readable storage medium, storing software instructions, which when executed by one or more processors cause performance of any one of the foregoing methods as discussed above.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
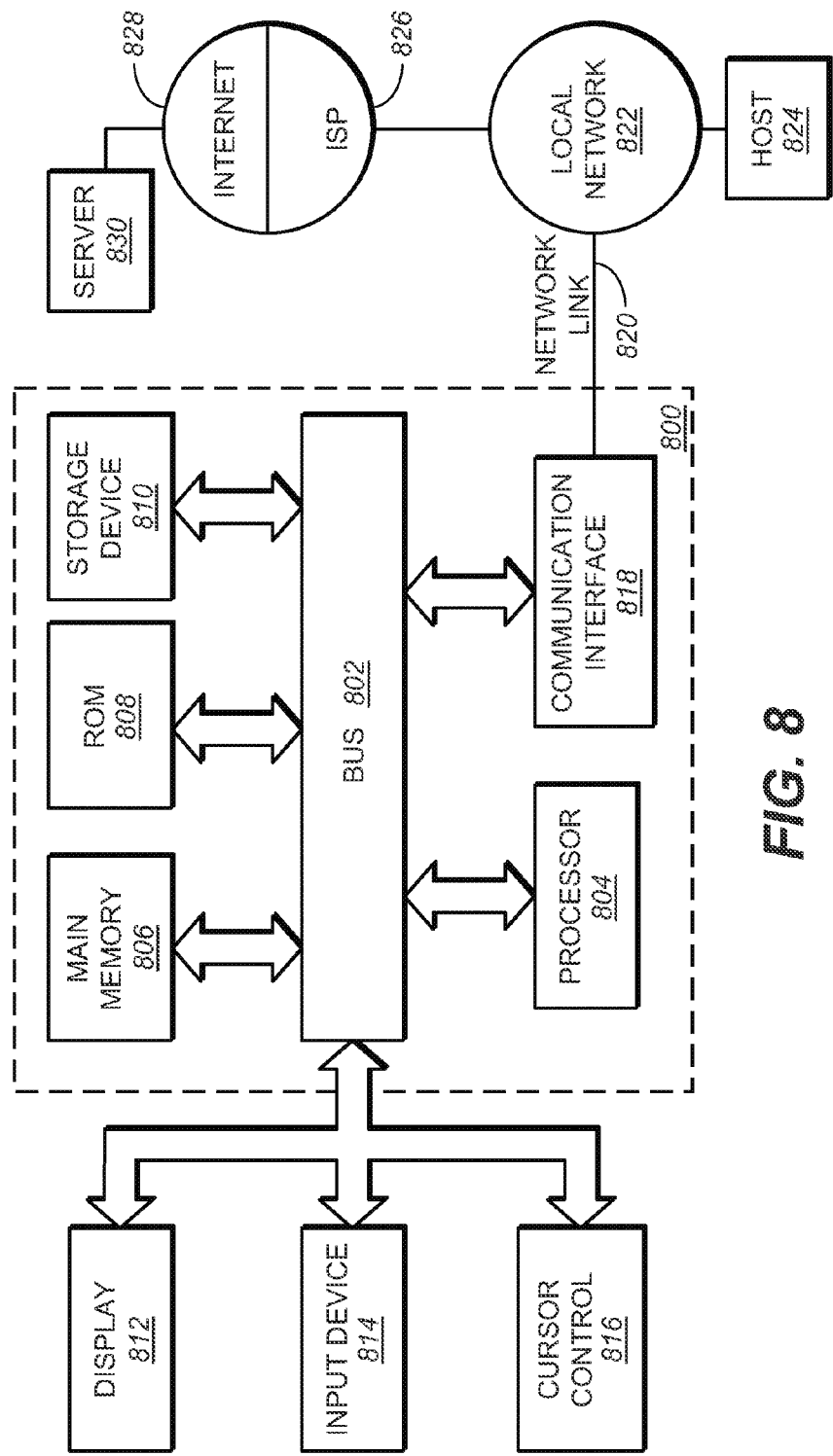
FIG. 8 illustrates an example hardware platform on which a computer or a computing device as described herein may be implemented, according an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

12. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   accessing first images in a first color grade version of a particular image content, the first color grade version being targeted for a first class of displays;
   accessing second images in a second different color grade version of the particular image content, the second color grade version being targeted for a second different class of displays;

dividing at least one of the first images and the second images into a plurality of clusters of pixels; and interpolating the first images and the second images to generate third different images for a third color grade version of the particular image content using one or more interpolation parameters, the third color grade version being targeted for a third different class of displays, at least one of the one or more interpolation parameters having two or more different values in two or more different clusters in the plurality of clusters of pixels, wherein the one or more interpolation parameters are based on functions of luminance values of the images and the second images.

2. The method of claim 1, wherein the third images are generated by further interpolating with a fourth different color grade version of the particular image content, the fourth color grade version being targeted for a fourth different class of displays.

3. The method of claim 1, wherein the second images are generated based at least in part on the first images.

4. The method of claim 1, further comprising:
normalizing the first color grade version into a normalized second color grade version based on display characteristics of the second class of display; and
interpolating the first images and at least one of the second images or the normalized second version to generate the third different images.

5. The method of claim 1, wherein each of a first subset of the first images and a first subset of the second images and a first subset of the third images comprises a first part of the particular image content, wherein each of a second subset of the first images and a second subset of the second images and a second subset of the third images comprises a second part of the particular image content, wherein the first subset of the third images is derived from the first subset of the first images and the first subset of the second images using a first set of interpolation parameters, and wherein the second subset of the third images is derived from the second subset of the first images and the second subset of the second images using a second different set of interpolation parameters.

6. The method of claim 5, wherein the first subset and the second subset of the third images represent two different scenes in the particular image content.

7. The method of claim 1, wherein at least one of the interpolation parameters depends on one or more of: maximum luminance values, minimum luminance values, color gamut areas, color gamut volumes, ambient light levels, or color channel values.

8. The method of claim 1, further comprising:
identifying an object and other image portions in one or more images of the first images or the second images; and
assigning different interpolation parameter values to the object and the other image portions.

9. The method of claim 1, further comprising:
analyzing one or more of the first images or the second images;
determining interpolation parameter values based at least in part on results of analyzing the one or more of the first images or the second images.

10. The method of claim 1, wherein the third images are derived with interpolation performed in one of: spatial domains, spatial frequency domains, time domains, or a transform domain.

11. The method of claim 1, wherein the third images are derived with interpolation using different sets of interpolation parameter values relating to: (a) one or more particular images of the first images, (b) one or more particular scenes of the first images, or (c) one or more images at or near one or more transitions of different scenes of the first images.

12. The method of claim 1, wherein one of the first and second color grade versions represents a normalized version.

13. The method of claim 1, further comprising encoding the first images and one or more of interpolation parameters or normalization parameters into an output video signal.

14. The method of claim 1, wherein the interpolation parameters comprise at least one similarity measure based on one or more of: luminance values, color gamut areas, color gamut volumes, or ambient light levels.

15. The method of claim 1, wherein the third images are derived with interpolation performed in one of: YPbPr color spaces, RGB color spaces, or other standard-based or proprietary color spaces.

16. The method as recited in claim 1, further comprising interpolating one or more input images represented, received, transmitted, or stored with one or more input video signals into one or more output images represented, received, transmitted, or stored with one or more output video signals.

17. A method comprising:
decoding image data in one or more input video signals into first images in a first color grade version of particular image content and one or more interpolation parameters, wherein the one or more interpolation parameters are generated by an encoder in response to functions of luminance values of the first images in the first color grade version and luminance values of second images in a second different color grade version of the particular image content, the first color grade version being targeted for a first class of displays and the second color grade version being targeted for a second class of displays, at least one of the one or more interpolation parameters having two or more different values in two or more different clusters in a plurality of clusters of pixels in at least one of the first images; and
reconstructing, based at least in part on the first images and the one or more interpolation parameters, third images of the particular image content in a third color grade, the third images being targeted for a third different class of displays.

18. An apparatus comprising a processor and configured to perform any one of the methods recited in claim 1, or 17.

19. The method of 17, further comprising rendering the third images on a target display in the third class of displays.

20. A computer readable, non-transitory, storage medium, storing software instructions, which when executed by one or more processors cause performance of any one of the methods recited in claim 1, or 18.

* * * * *